United States Patent [19]

Netter

[11] Patent Number: 4,755,954
[45] Date of Patent: Jul. 5, 1988

[54] INTENSITY LEVEL WINDOWING SYSTEM FOR IMAGE DISPLAYS

[75] Inventor: Zvi Netter, Haifa, Israel

[73] Assignee: Elscint Ltd., Haifa, Israel

[21] Appl. No.: 730,116

[22] Filed: May 3, 1985

[30] Foreign Application Priority Data

May 21, 1984 [IL] Israel ......................................... 71878

[51] Int. Cl.[4] .......................... G06F 15/68; H04N 3/00
[52] U.S. Cl. ...................................... 364/518; 364/414; 340/728; 340/793; 358/166
[58] Field of Search ............... 364/518, 521, 522, 577, 364/723, 718, 719, 553, 742, 414; 382/50, 54; 340/728, 729, 747, 793; 358/166, 111

[56] References Cited

U.S. PATENT DOCUMENTS

| | | | |
|---|---|---|---|
| 4,337,514 | 6/1982 | Favreau et al. ................ | 364/553 X |
| 4,365,304 | 12/1982 | Ruhman et al. .................. | 382/54 X |
| 4,394,744 | 7/1983 | Wrench, Jr. ..................... | 358/166 X |
| 4,430,748 | 2/1984 | Tuhro et al. ..................... | 340/728 X |
| 4,438,495 | 3/1984 | Collins et al. ..................... | 382/54 X |
| 4,450,482 | 5/1984 | Ackermann ..................... | 358/164 X |
| 4,498,080 | 2/1985 | Culver ............................. | 340/747 X |
| 4,559,557 | 12/1985 | Keyes et al. ..................... | 358/166 X |
| 4,563,740 | 1/1986 | Blake et al. ......................... | 364/414 |
| 4,590,582 | 5/1986 | Umemura ........................ | 358/111 X |
| 4,618,928 | 10/1986 | Honda et al. .................... | 358/166 X |

OTHER PUBLICATIONS

*SPIE, Application of Optical Instrumentation in Medicine,* vol. 173, 1979, van Heck, A. A., "Display System For Computed Tomographic (CT) Images", pp. 244–248.

*Primary Examiner*—R. L. Moses
*Assistant Examiner*—J. Pendegrass
*Attorney, Agent, or Firm*—Sandler & Greenblum

[57] ABSTRACT

A windowing system for use when using data to form video display images. The digital data is operated on by a transfer function delineated by predefined parameters or by newly generated parameters determined by the image being displayed.

13 Claims, 2 Drawing Sheets

INTENSITY LEVEL WINDOWING SYSTEM FOR IMAGE DISPLAYS

FIELD OF THE INVENTION

This invention is concerned with equipment and methods for displaying digital images using raster video display equipment and especially wherein extensive, fast and flexible windowing of image data is required, as is the case in the more advanced medical imaging systems.

BACKGROUND OF THE INVENTION

In medical imaging the diagnosis is usually made by radiologists. When the images are available in computer readable form (digitized), the analysis of the images may be performed while they are displayed on a video monitor. Scientists in the medical diagnostic imaging field are continuously working to improve the quality of the images, acquired by the various modalities in the field. One of the well-known methods for improving the detectibility of leisions of a displayed organ is by "windowing".

Windowing describes the process of displaying the detected data by extending certain detected data ranges to fill the entire intensity range of the displayed image. For example, there are only a limited number of gray levels which may be distinguished, this being due to inherent limitations of the CRT and the human eye. Therefore, it is very important to utilize the available gray levels in the regions of data values which carry the most useful information. To illustrate, assume that a black and white system has the capability of displaying 256 gray levels. If the acquisition of data occuring during an examination of a subject results in only 86 gray levels clustered away from the lowest and the highest levels; then, only about one-third of the system's contrast display capability would be used.

The originators of "windowing" recognized that "spreading" the data over the 256 levels, that are available instead of displaying the data only over the acquired 86 levels would greatly enhance the contrast resolution. More particularly, the significant data may reside in a band of values, say 1000–1100. Rational utilization of the "gray level resource" is to assign the data value 1000 to the gray level 0, the data value 1100 to gray level 255 and intermediate data values to their proportionally corresponding gray level values in the range 1–254. In the example given, the contrast would be enhanced by a factor of about 3 to 1.

Windowing is presently accomplished by using a table-look-up or look-up tables. When displaying an image, the data is stored in a digital memory, and is read out repeatedly to refresh the video display. For that purpose special circuits are used to control the read out sequence, to synchronize the raster monitor timing, to convert the digital data into analog data, etc. These circuits are well known to those skilled in the art.

To perform the "windowing" function using table look up techniques, a translation table is stored in a memory within the electronic circuitry responsible for the display refresh. The image data, on a pixel-by-pixel basis is used as an address and applied to the memory. The corresponding gray level as stored in the memory is readout and used to control the intensity of the displayed pixel.

While the table look up based windowing technique may be an acceptable solution for relatively simple displays it does not provide a good solution for more advanced display systems. For example, in computerized tomographic (C.T.) imaging the following conditions adverse to prior art windowing techniques are or may be encountered:

The data may be represented by 12 bits

The display system matrix may be a 1024×1280 unit

A split screen may be used (subdividing the 1024×1280 matrix into say twenty (20) 256×256 images)

Each of the 20 images ideally requires a different window setting

The raster display is refreshed at a rate of (60 frames/sec.) in order to be flicker free Under such conditions video signals in the range of 100 Megapixels/sec are needed to support the video rate. The memories currently used for table look up may operate at a cycle time of about 75 nanosecs. Hence, eight parallel channels are required to support the required rate. Also note that 20 (images)×8 (channels)×4K (length of table)=640 Kilobytes. With current technology, this would require 320 4K static memory components, each with a 4 bit capacity.

This high number of memory components plus the associated support electronics makes the video rate windowing based on table look up devices impractical, at least for the more advanced display systems as described above.

Accordingly, there is a need in the field of imaging for equipment and procedures that will accomplish the windowing function in a new and improved manner that does not require such a vast number of memory components.

An objective of the present invention is to provide efficient and economical equipment and methods for the performance of windowing as required for video rate windowing in raster refresh video systems, in general, and for high resolution sophisticated units in particular.

BRIEF DESCRIPTION OF THE INVENTION

In accordance with a preferred embodiment of the invention, a windowing system for use in converting digital data into video display images is provided, said system comprising:

(a) a source of the digital data of an image for use in refreshing the video display image, (b) means for operating on the digital data with a transfer function to perform windowing, during the transfer of the data for refreshing the video display, and (c) means for applying the operated on digital data for refreshing the video display.

A feature of the invention is the provision of predefined parameters for delineating the transfer function, or generating the required parameters.

Yet, another feature of the invention is to support the dynamic load of the parameters according to the image being displayed at the specific points.

The invention also enables the radiologist studying the images to interactively change the transfer function, i.e. the window settings, using console controls. The new settings cause new parameters to be computed and fed into the system to vary the transfer function.

Another principle feature of the invention is based on transforming the data to accomplish the windowing operation. The transformation may be realized in circuitry such as a VLSI circuit using current semiconductor technology.

Still another feature of the present invention includes using the presently described windowing method in series with look-up table type windowing where some of the images also require transfer functions which are better represented by table look up. The combination of the prior art type windowing and the "peicemeal windowing" of the invention also saves equipment and/or time.

According to another feature, the present invention includes using a semi-floating point multiplier to most effectively obtain the slopes of the transfer function.

The above-mentioned and other features and objects of the invention will be better understood when considered in the light of the following description of embodiment of the invention explained in conjunction with the accompanying drawings, wherein:

GENERAL DESCRIPTION

Figure 1:
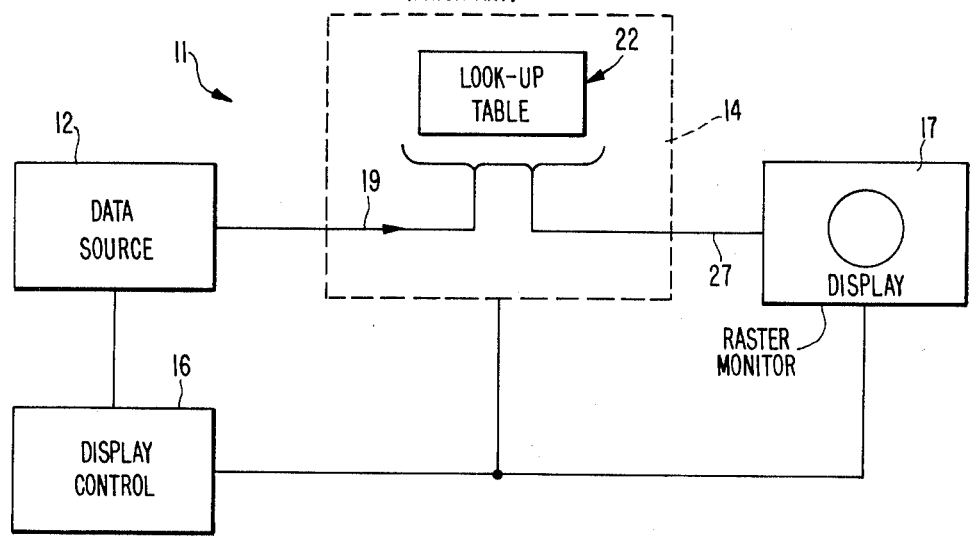
FIG. 1 is a block diagram showing of a typical prior art imaging system equipped to perform "windowing"

FIG. 1 is a block diagram of a typical prior art windowing arrangement 11 which shows a source of image data 12. The data source 12 may be memory means where the data has been acquired for medical diagnostic imaging in any of the well known modes of acquisition such as for example using ultrasound, computerized tomography, digital fluorography or radiography, radiation by gamma ray, or x-ray, or nuclear magnetic resonance. The data may also come directly from an acquisition system as a data stream.

The object as imaged is "divided" into elemental areas which are related to the pixels of the image. Similarly the elements of the image are related to elemental positions in a display memory. The display memory is usually a matrix divided into rows and columns. The intersections of the rows and columns are related to the elemental areas and to the pixels either directly or indirectly. Thus when data is acquired the position of the data events is also noted. Hence the data is stored in accordance with the elemental areas of the object being imaged.

The data may be processed prior to imaging to enhance the image. Many procedures including "windowing" are followed that are well known in the art to enhance the images. The procedures for accomplishing the enhancement are generally included in software used by an associated computer. The windowing part of the data processing is indicated in FIG. 1 as a separate dashed line block 14. The processing, transfering to and from memory and the display are all done under the control of the control unit 16.

After the enhancement steps, which may be performed off-line or at video rates and the windowing are accomplished, the image is displayed by the display unit 17. Accordingly, FIG. 1 basically shows the steps of processing of the data to enhance the image along with the actual image display. The display source 12 as explained above may be the memory used to store the data for its use in the refresh process as well as during the enhancement and/or acquisition steps.

In the past the windowing step has been accomplished either by a software operation at a non-video rate, or by a video rate look up table technique. As shown in FIG. 1, the data for windowing is received on data bus 19. The address of the data is determined according to its location in the display memory by the display control 16. Using the data on bus 19 as the address the data is acquired from the look-up table, shown as the look-up table 22. The data acquired from the look-up table may then be transferred for further use.

The look up table data is passed to the output data bus 27. The entire look-up table operation is controlled by display control unit 16 which may determine among other things which look-up table to enter. There are often a plurality of look-up tables and the determination of which look-up table is used, is ordinarily made by information in the display control unit. Thus, in the prior art windowing has been accomplished using look-up tables with the consequent necessity of a relatively large number of extra memory components.

Figure 2:
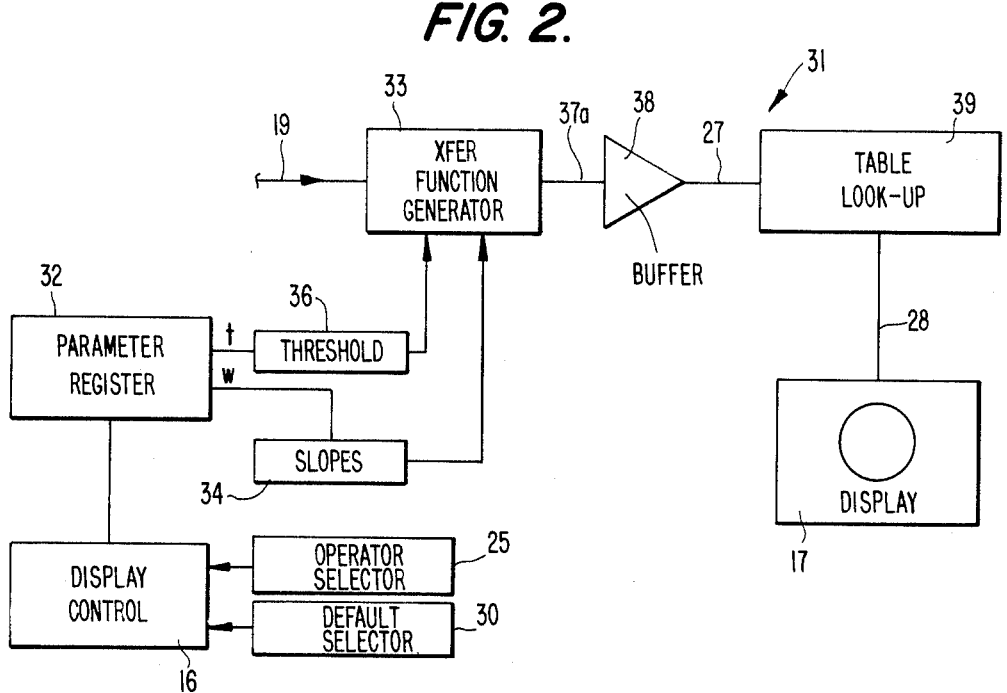
FIG. 2 is a block diagram showing of the equipment providing the windowing of the present invention.
Figure 3:
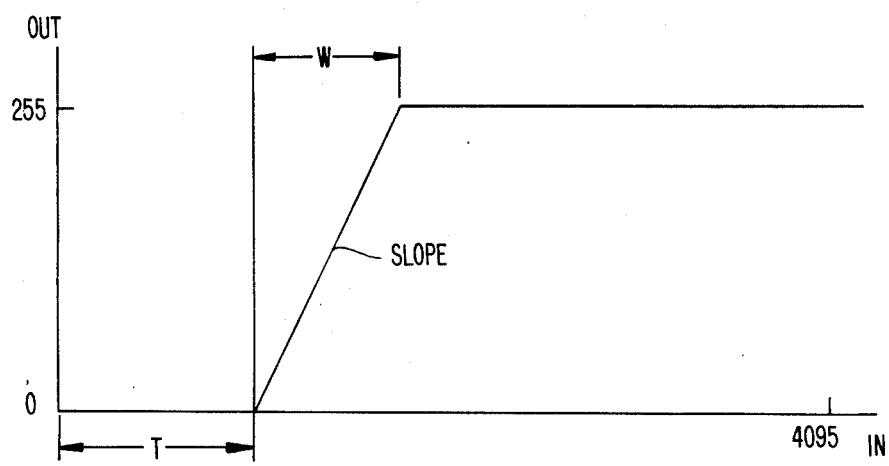
FIG. 3 is a first transfer function of the type generated and used in the inventive windowing arrangement.
Figure 4:
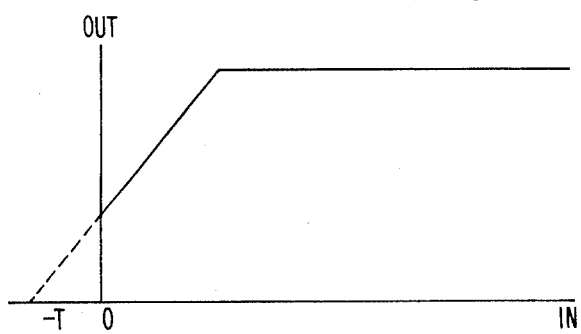
FIG. 4 is a second transfer function of the type generated and used in the inventive windowing arrangement.
Figure 5:
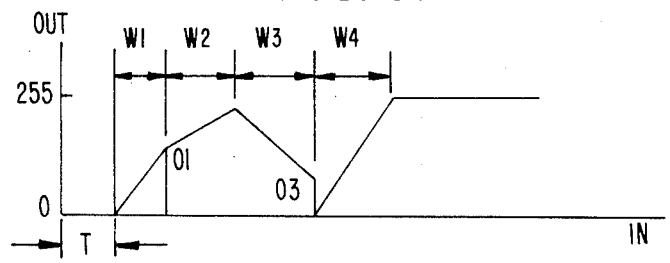
FIG. 5 is a third transfer function of the type generated and used in the inventive windowing arrangement.

FIG. 2 shows the windowing system 31 of the present invention, using dedicated hardware. The dedicated hardware is designed to generate transfer functions for use in place of the look up tables. The hardware can generate a simple linear transfer function as shown in FIGS. 3 and 4, or a plurality of piecemeal linear functions such as shown in FIG. 5. The piecemeal linear functions are the general case while the functions of FIGS. 3 and 4 are specific cases.

In FIG. 2 data arrives on data bus 19. There is no look-up table memory at this juncture. There is instead a parameter register means 32 which obtains its parameters from display control unit 16. The parameter register means are used to store the basic parameters (threshold and slope) of the transfer functions used in place of the look-up tables. The transfer functions are linear functions having a slope that provides the desired output based on a given input.

The incoming data on conductor 19 is translated to out-going data on conductor 37 by the transfer function generator 33. The outgoing data passes through a buffer 38 to go either directly to display unit 17 or a look-up table windowing means 39 prior to being connected to display monitor 17. The line 37(a) indicates that a plurality of transfer function generators can be connected in parallel to control different areas of the the display 17 within the scope of the invention.

In a preferred embodiment all of the data from the transfer function generator is connected through the look up table unit 39. If the data as received from the transfer function generator output does not require look-up table processing then a 1:1 look-up table function is used to effectively bypass the non-linear window 39. The bypassing could also be accomplished by switching means in any well known manner.

The non-linear window table look up 39 is the type shown in FIG. 1. However, time and memory components are reduced using the combined arrangement of the transfer function generator and the non-linear window. With the combination, the auxilliary windowing i.e. non-linear windowing by the look-up table technique can be accomplished using fewer bits. For example, where the input to the transfer function generator is 12 bits, its output is 8 bits. Thus, the look-up table of non-linear window 39 operates on 8 bits instead of 12 bits saving memory size by a factor of 16. Additional saving is caused by the reduction of total number of different window settings required. It is sufficient for the table look to deal with, say, 16 different settings of window. This may be realized by a 4KByte memory (for the above example this reduces the number of components required from 320 to 16). The peicemeal linear window can deal easily with the larger number of window settings required, say 64, or 256, without increasing the table-look-up memory.

The parameters used in determining the thresholds and the slopes of the transfer function are stored in the parameter register means and in effect, the transfer function generator acts as a multiplier which multiplies the input data, less the threshold by the slope of the generated transfer function (defined as 255/W in FIG. 3), (255-B)/w in FIG. 4 and $01/W1$, $255-02/W2$, $-255-03/W3$ and $255/W4$ in FIG. 5 to obtain a product that is the output data.

The system, in a preferred embodiment, uses a semi-floating point for determining the product. If a fixed point determination were used then, in order to achieve windowing, on an input data length of 12 bits and an output data length of 8 bits, for example, a 28 bit resolution in the number representing the slope would be required. To reduce the size of the multiplier, a semi-floating point mode is used. This reduces the multiplier to a 12 bit integer made up of a 4 bit exponent E, and an 8 bit mantissa S. E and S are generated by the control unit using the following steps:

a. Determination of exponent E (E is assumed to be an integer in the range of 0 to 12)

E satisfies the relationship:

$$2\exp(11-E) < W = < 2\exp(12-E),$$

For example, when W=2
2exp 0<2 = <2exp 1, therefore E=11 b. Determination of mantissa S

Let $SF = (2\exp(12-E))/W$ where SF is in the range $1 = < SF < 2$
then S is represented by an 8 bit integer and:

$$S = INT(128*SF) = INT(128*2\exp E/W)$$

Thus, for different values of width W, the values of threshold T, E and S are stored and are used to operate on the incoming data to obtain the outgoing data.

The linear section of the transfer function provides the number of output units per input element. For example, in FIG. 3, the output is shown extending from zero to 255. The slope is 255 divided by the desired window width. The linear windowing is based on the use of the slope as a multiplier, which multiplies the input data less the threshold to obtain the output data, limited to 255.

In practice, piecemeal linear windowing is accomplished by a semi-custom or custom made VLSI unit. The circuit operates in a cycle of 75 nanoseconds. The pixel time is 37.5 nanoseconds in the 512 line display and close to 9.3 nanoseconds in the 1024 line display. Due to timing consideration the windowing is performed using pipe-line techniques and "windowing channels" which operate in parallel. For example, the 512 line display uses two parallel channels and a 1024 line display uses eight channels.

The piecemeal linear windowing as disclosed herein is either used by itself or with a table look-up window, as shown in FIG. 2. The piecemeal linear window may perform according to the graphs of FIG. 3, FIG. 4, or FIG. 5. In the configuration of FIG. 4 "biased windowing" is represented. The transfer function is provided using a negative threshold value $-T$. In the configuration of FIG. 5, which is the generalized case, a plurality of slopes are determined based on the widths of the different sections and corresponding thresholds.

The windowing arrangement of the invention can also be used in those cases that call for visual linearization of the display through multiplication by the transfer function. This is achieved, using the display, by setting up one of the tables of the non-linear window normalized the full line 256 gray levels. Subsequently the windowing function is performed totally by changing the linear window parameters on an interactive basis using operator selection means shown at 25 according to the center and width as if only linear windowing was being accomplished. If the operator does not select, the last selection is used or another "default" operation occurs as indicated at 30. Alternatively the parameters can be automatically selected to display bones rather than soft tissue. The display control upon recognizing intensity values characteristic of bones may automatically select the windows to highlight bone over soft tissue.

In practice, the data is operated on by subtracting the threshold and multiplying by the slope. If the result of subtracting the threshold is less than or equal to zero then the slope is multiplied by zero. If the product of the slope and the difference between the data and the threshold is equal to or greater than 255 (in this example) then the value 255 is used. Hence, the transfer function generator provides very effective windowing where a "linear" transfer function is required. The great number of memory components required by prior art systems, in one preferred embodiment were replaced by a small number of VLSI components.

The invention has been described using exemplary circuitry, but it should be understood that these descriptions were made by way of example and not as a limitation on the scope of the invention which is defined by the appended claims.

What is claimed is:

1. A windowing system for use in windowing video displayed images, said system comprising:
    a source of digital data for use in providing the displayed images,
    means for supplying said digital data at substantially video raster rates,
    hardware means including a transfer function generator to provide an output that is an input transformed by a transfer function of said transfer function generator, said output effectively provided at said video raster rate, said transfer function being variable responsive to operator designated parameters including slope and threshold for transforming the said digital data to extend the data range of interest to substantially fill the entire intensity range of the displayed image, whereby windowing is accomplished on a non-look up table basis.

2. The system of claim 1, wherein said transfer function generator means implements a transfer function algorithm defined by said parameters.

3. The system of claim 1, wherein said parameters are selected by an operator.

4. The system of claim 3, where means are provided wherein said parameters may also be supplied by default.

5. The system of claim 1, wherein said parameters determine slope and threshold values that include negative values.

6. A windowing system for use in windowing of video displayed images, said system comprising:
a source of digital data for use in providing the displayed images,
said source of digital data comprising memory means for storing sid digital data,
means for reading out said digital data at substantially a video raster rate for use in refreshing said video display, and
hardware means including a transfer function generator effectively operated at said video raster rate during said read-out responsive to parameters including slope and threshold for transforming the said digital data to extend the data range of interest to substantially fill the entire intensity range of the displayed image.

7. The system of claim 6, wherein said algorithm utilizes a semi-floating point.

8. The system of claim 6, including additional windowing means comprising look-up tables.

9. The system of claim 6, wherein said additional windowing means is in series with said transfer function generator means.

10. The system of claim 6, where said parameters are computed from the said data.

11. The system of claim 6, wherein said parameters determine a threshold value and a slope value for a linear transfer function.

12. The system of claim 6, wherein said parameters determine a plurality of threshold values and slope values for a plurality of linear transfer functions in a single display.

13. The system of claim 6 wherein said transfer function generator comprises a transfer function algorithm defined by said designated parameters and wherein said hardware means comprises multiplier means for multiplying the said digital data by values determined by said transfer function algorithm.

* * * * *